(12) United States Patent
Kamiya

(10) Patent No.: US 7,425,808 B2
(45) Date of Patent: Sep. 16, 2008

(54) VEHICLE DRIVE SYSTEM AND VEHICLE PROVIDED WITH THE SAME

(75) Inventor: Munehiro Kamiya, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 210 days.

(21) Appl. No.: 10/586,528

(22) PCT Filed: Nov. 14, 2005

(86) PCT No.: PCT/JP2005/021199

§ 371 (c)(1),
(2), (4) Date: Jul. 19, 2006

(87) PCT Pub. No.: WO2006/054675

PCT Pub. Date: May 26, 2006

(65) Prior Publication Data

US 2007/0210729 A1    Sep. 13, 2007

(30) Foreign Application Priority Data

Nov. 17, 2004  (JP) .............................. 2004-333528

(51) Int. Cl.
*H02P 3/14* (2006.01)
(52) U.S. Cl. .................. 318/376; 318/139; 318/141; 318/254; 310/166; 310/168; 180/65.2
(58) Field of Classification Search .............. 318/139, 318/141, 149, 254, 370, 376, 720; 310/162, 310/166, 168; 180/65.2
See application file for complete search history.

(56) References Cited

U.S. PATENT DOCUMENTS 3,679,953 A * 7/1972 Bedford .............. 318/254.1
4,888,513 A * 12/1989 Fratta .................. 310/216
5,418,415 A * 5/1995 Ishizaki ................ 310/162
5,811,904 A 9/1998 Tajima et al.
5,825,113 A * 10/1998 Lipo et al. ............. 310/181
7,268,537 B2 * 9/2007 Nakano et al. ........ 324/207.25
2003/0034699 A1 2/2003 Selewski et al.

(Continued)

FOREIGN PATENT DOCUMENTS

EP    1 130 740 A2    9/2001

(Continued)

*Primary Examiner*—Paul Ip
(74) *Attorney, Agent, or Firm*—Oliff & Berridge, PLC

(57) ABSTRACT

A rotor is provided with slits each of which serves as a flux barrier blocking a magnetic flux. A direction shown by an arrow is a forward direction along which the rotor rotates when a vehicle moves forward. Each of the slits has a width tapering down from a trailing position toward a leading position with respect to the forward direction. The rotation in a reverse direction opposite to the forward direction shown by the arrow causes larger magnetic flux linkage than the rotation in the forward direction, and hence generates high torque and high counterelectromotive force. Therefore, in the reverse direction, the rotor cannot serve as a motor to produce an output unless high voltage is applied thereto. Accordingly, the torque generated in the reverse direction is used for regenerative operation. It is thereby possible to provide a vehicle drive system capable of exhibiting performance in a well-balanced manner between power running and regenerative operation, and a vehicle provided with the same.

10 Claims, 4 Drawing Sheets

U.S. PATENT DOCUMENTS

| | | | |
|---|---|---|---|
| 2004/0112655 A1* | 6/2004 | Matsunobu et al. | 180/65.2 |
| 2004/0245949 A1* | 12/2004 | Ueda et al. | 318/254 |
| 2005/0093538 A1* | 5/2005 | Nakano et al. | 324/207.25 |
| 2006/0272870 A1* | 12/2006 | Matsunobu et al. | 180/65.2 |
| 2006/0290316 A1* | 12/2006 | Seguchi et al. | 318/720 |
| 2007/0152529 A1* | 7/2007 | Kamiya | 310/166 |
| 2007/0241699 A1* | 10/2007 | Osada et al. | 318/141 |

FOREIGN PATENT DOCUMENTS

| | | |
|---|---|---|
| JP | A-62-260587 | 11/1987 |
| JP | A-01-122355 | 5/1989 |
| JP | A-08-033246 | 2/1996 |
| JP | A-09-285086 | 10/1997 |
| JP | A-10-150754 | 6/1998 |
| JP | A-11-308828 | 11/1999 |
| JP | A-2000-350310 | 12/2000 |
| JP | A-2001-128400 | 5/2001 |
| JP | A-2001-186693 | 7/2001 |
| JP | A-2001-238417 | 8/2001 |
| JP | A-2003-504996 | 2/2003 |
| WO | WO 01/03272 A1 | 1/2001 |
| WO | WO 02/097954 A1 | 12/2002 |

* cited by examiner

FORWARD DIRECTION
(MOVE FORWARD)

VEHICLE DRIVE SYSTEM AND VEHICLE PROVIDED WITH THE SAME

TECHNICAL FIELD

The present invention relates to a vehicle drive system and a vehicle provided with the same, and in particular to a vehicle drive system including a rotating electric machine and a vehicle provided with the same.

BACKGROUND ART

In recent years, a compact and efficient motor has been sought as a motor for driving an electric vehicle, a hybrid vehicle and others. Research has thus been conducted on various motors such as a synchronous reluctance motor and an embedded magnet synchronous motor.

Among these, Japanese Patent Laying-Open No. 10-150754 discloses an example of the reluctance motor, in which a slit provided at a rotor portion of a flux-barrier motor is designed to vary in width to improve efficiency. In particular, the patent document discloses in FIG. 7 that a slit is formed to have a width smaller at a leading position ahead of the magnetic pole center than at a trailing position, with respect to a rotation direction.

When a motor is used for driving an electric vehicle, a hybrid vehicle and others, an important characteristic of the motor is that it performs regenerative operation. In the conventional method of improving performance, performance during power running has mainly been pursued, while performance during regenerative operation has hardly been pursued.

As to the motor vehicle in particular, a battery is mounted thereon to serve as a direct current power supply for driving a motor, and hence its voltage fluctuations during power running and regenerative operation are not negligible. It is therefore required to improve performance in a well-balanced manner between power running and regenerative operation in consideration of the voltage fluctuations.

DISCLOSURE OF THE INVENTION

An object of the present invention is to provide a vehicle drive system capable of exhibiting performance in a well-balanced manner between power running and regenerative operation, and a vehicle provided with the same.

To summarize, the present invention is a vehicle drive system, includes: a rotating electric machine structured to have a forward direction and a reverse direction as a rotation direction of an output shaft, a maximum output in the reverse direction being smaller than the maximum output in the forward direction; a battery discharging during power running of the rotating electric machine and being charged during regenerative operation of the rotating electric machine, voltage between terminals of the battery being increased while the battery is charged, and being decreased while the battery discharges, and a rotary shaft rotating in a direction allowing a vehicle to move forward in accordance with rotation of the output shaft in the forward direction.

Preferably, the rotating electric machine includes a stator and a rotor having a shape that allows the maximum output in the rotation in the reverse direction to be smaller than the maximum output in the rotation in the forward direction.

More preferably, the rotor has a plurality of salient pole portions, and each of the plurality of salient pole portions has a shape tilted with respect to an axis passing through a rotation center and orthogonal to the output shaft.

More preferably, the rotor is provided with a flux barrier bilaterally asymmetric with respect to an axis passing through a rotation center and orthogonal to the output shaft.

Preferably, the vehicle drive system further includes an inverter disposed on a path for receiving and distributing current between the battery and the rotating electric machine, and a control device obtaining rotation information from the rotating electric machine to control the inverter. The control device controls the inverter such that torque in the forward direction is generated in the rotor in accordance with an acceleration instruction to allow the rotating electric machine to perform power running, and that torque in the reverse direction is generated in the rotor in accordance with a deceleration instruction to allow the rotating electric machine to perform regenerative operation.

According to another aspect of the present invention, the present invention is a vehicle, includes: a vehicle drive system, and a wheel connected to a rotary shaft. The vehicle drive system includes a rotating electric machine structured to have a forward direction and a reverse direction as a rotation direction of an output shaft, a maximum output in the reverse direction being smaller than the maximum output in the forward direction, a battery discharging during power running of the rotating electric machine and being charged during regenerative operation of the rotating electric machine, voltage between terminals of the battery being increased while the battery is charged, and being decreased while the battery discharges, and the rotary shaft rotating in a direction allowing a vehicle to move forward in accordance with rotation of the output shaft in the forward direction.

Preferably, the rotating electric machine includes a stator and a rotor having a shape that allows the maximum output in the rotation in the reverse direction to be smaller than the maximum output in the rotation in the forward direction.

More preferably, the rotor has a plurality of salient pole portions, and each of the plurality of salient pole portions has a shape tilted with respect to an axis passing through a rotation center and orthogonal to the output shaft.

More preferably, the rotor is provided with a flux barrier bilaterally asymmetric with respect to an axis passing through a rotation center and orthogonal to the output shaft.

Preferably, the vehicle drive system further includes an inverter disposed on a path for receiving and distributing current between the battery and the rotating electric machine, and a control device obtaining rotation information from the rotating electric machine to control the inverter. The control device controls the inverter such that torque in the forward direction is generated in the rotor in accordance with an acceleration instruction to allow the rotating electric machine to perform power running, and that torque in the reverse direction is generated in the rotor in accordance with a deceleration instruction to allow the rotating electric machine to perform regenerative operation.

According to the present invention, it is possible to implement a vehicle drive system provided with a rotating electric machine in which a maximum output during power running and a maximum output during regenerative operation are well-balanced.

BEST MODES FOR CARRYING OUT THE INVENTION

Figure 1:
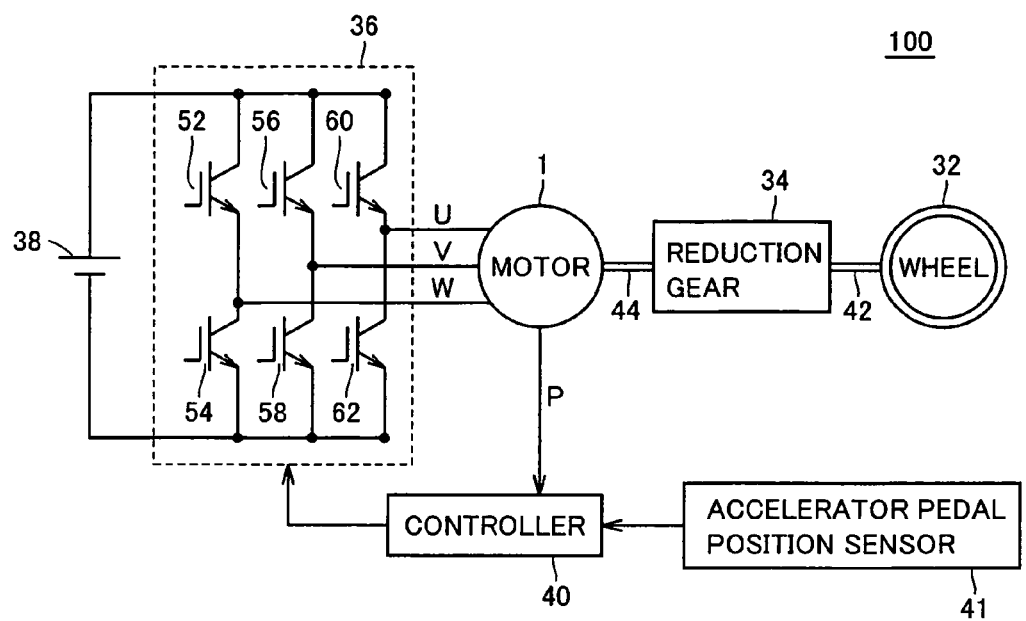
FIG. 1 is a diagram showing a configuration of a vehicle drive system 100 according to the present invention.

The embodiments of the present invention will hereinafter be described in detail with reference to the drawings, in which the same or corresponding portions are designated by the same reference characters, and the description thereof will not be repeated.

FIG. 1 is a diagram showing a configuration of a vehicle drive system 100 according to the present invention.

Referring to FIG. 1, vehicle drive system 100 includes a battery 38, a three-phase inverter 36 receiving energy from battery 38 during power running and returning energy to the battery during regenerative operation, and a rotating electric machine 1 in which current and voltage for each of U-phase, V-phase, and W-phase coils are controlled by three-phase inverter 36.

Three-phase inverter 36 includes IGBTs 52-62, each of which is a power semiconductor element. IGBT 52 and IGBT 54 are connected in series between positive and negative electrodes of battery 38, and their connection node is connected to the W-phase coil of the motor. IGBT 56 and IGBT 58 are connected in series between the positive and negative electrodes of battery 38, and their connection node is connected to the V-phase coil of the motor. IGBT 60 and IGBT 62 are connected in series between the positive and negative electrodes of battery 38, and their connection node is connected to the U-phase coil of the motor.

Vehicle drive system 100 further includes an accelerator pedal position sensor 41 detecting an accelerator pedal position of the driver, and a controller 40 receiving rotation information P from the motor to control three-phase inverter 36 in accordance with an output of accelerator pedal position sensor 4l. Controller 40 includes a CPU, a ROM, a RAM and the like, not shown, to control a gate of each of IGBTs 52-62.

Vehicle drive system 100 further includes a reduction gear 34 connected to an output shaft 44 of the motor, and a wheel 32 connected to an output shaft 42 of reduction gear 34.

Figure 2:
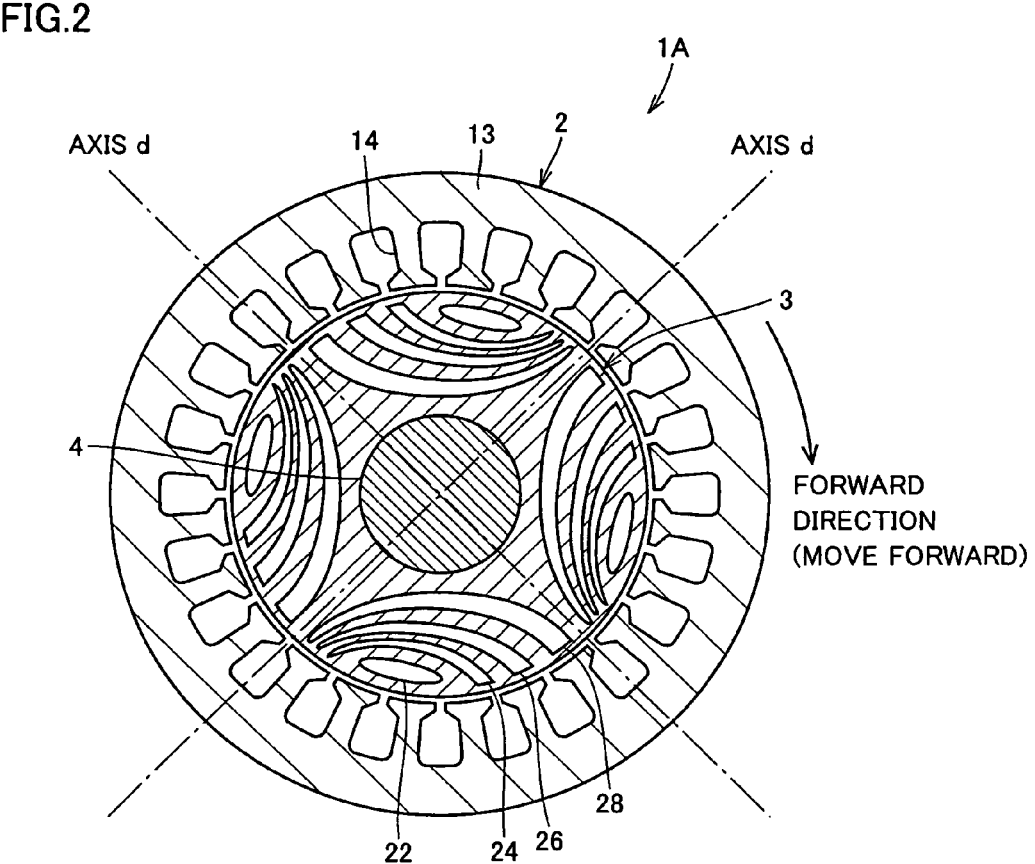
FIG. 2 is a cross section showing a shape of a first embodiment of a rotating electric machine 1 in FIG. 1.

FIG. 2 is a cross section showing a shape of a first embodiment of rotating electric machine 1 in FIG. 1.

Referring to FIG. 2, a rotating electric machine 1A includes a stator 2 and a rotor 3.

Each of stator 2 and rotor 3 is formed of stacked magnetic steel sheets. The central portion of rotor 3 is provided with a rotary shaft 4 penetrating the center of the magnetic steel sheets. Rotating electric machine 1 serves as a motor during power running for driving a vehicle, whereas it serves as a generator during regenerative operation for braking a vehicle.

Stator 2 includes a stator yoke 13, stator cores 14 connected to stator yoke 13, and a coil, not shown, wound around each of stator cores 14.

Rotor 3 is provided with slits 22, 24, 26, and 28, each of which serves as a flux barrier blocking a magnetic flux. A direction shown by an arrow in FIG. 2 is a forward direction along which the rotor rotates when the vehicle moves forward, and each of the slits has a width tapering down from a trailing position to a leading position with respect to the forward direction.

Figure 3:
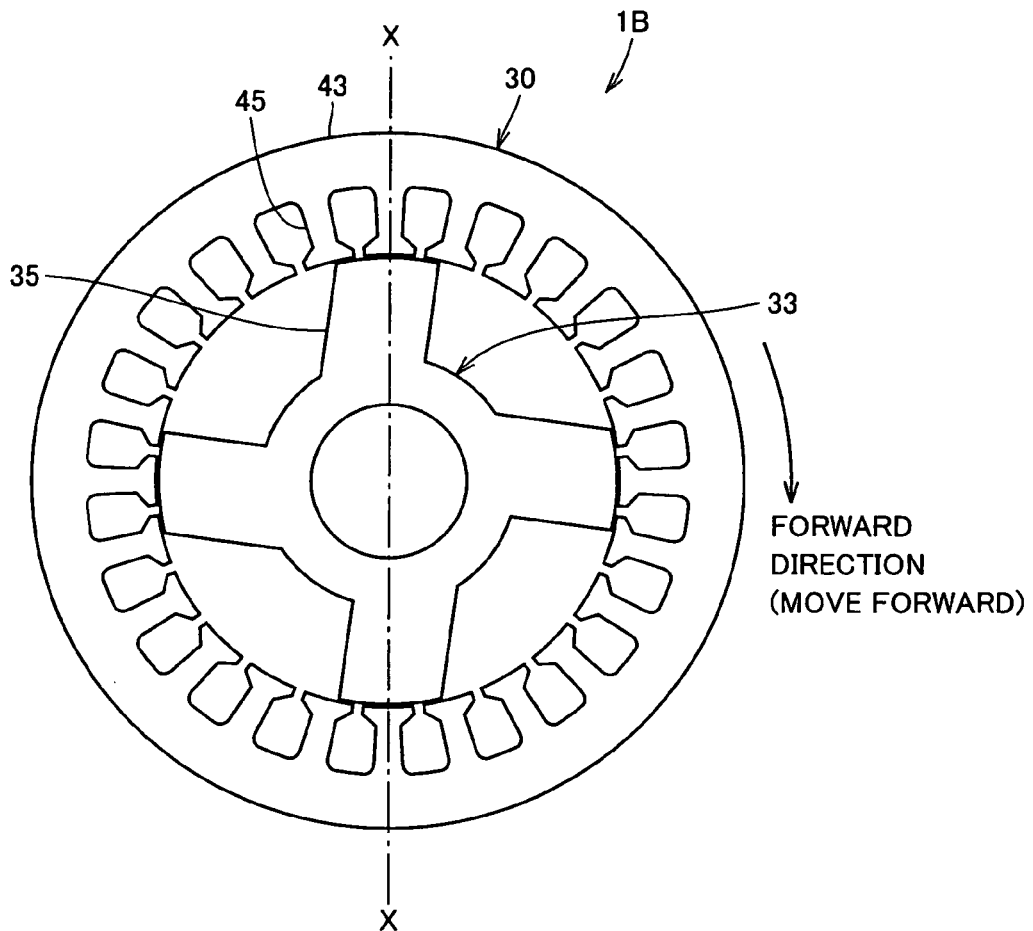
FIG. 3 is a cross section showing a shape of a second embodiment of the rotating electric machine 1 in FIG. 1.

FIG. 3 is a cross section showing a shape of a second embodiment of rotating electric machine 1 in FIG. 1.

Referring to FIG. 3, a rotating electric machine 1B includes a stator 30 and a rotor 33.

Stator 30 includes a stator yoke 43, stator cores 45 connected to stator yoke 43, and a coil, not shown, wound around each of stator cores 45.

Rotor 3 is a four-pole rotor in which two pairs of salient poles are formed. A salient pole 35 is tilted with respect to an axis X-X and has a bilaterally-asymmetric shape. A direction shown by an arrow in FIG. 3 is a forward direction along which the rotor rotates when the vehicle moves forward, and salient pole 35 is tilted in a direction tilted from a trailing side to a leading side with respect to the forward direction, and from the rotation center to the outside.

Figure 4:
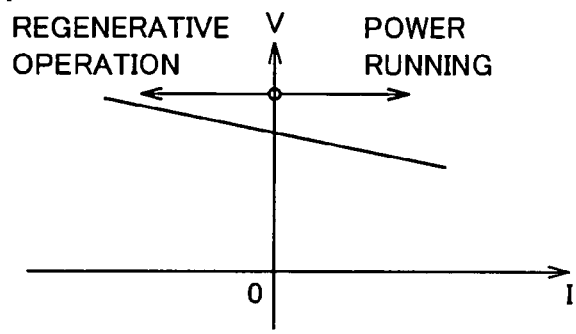
FIG. 4 is a diagram showing a current-voltage characteristic of a battery 38 in FIG. 1.

As to the shapes of the rotors shown in FIGS. 3 and 4, the rotation in a reverse direction opposite to the forward direction shown by the arrow causes larger magnetic flux linkage than the rotation in the forward direction, and hence generates high torque and high counterelectromotive force. Therefore, in the reverse direction, the rotor cannot serve as a motor to produce an output unless high voltage is applied thereto. Accordingly, the torque generated in the reverse direction is used for regenerative operation.

FIG. 4 is a diagram showing a current-voltage characteristic of battery 38 in FIG. 1.

Referring to FIG. 4, since battery 38 has internal resistance, voltage between terminals thereof drops more as current is increased during power running, i.e. during discharge operation. In contrast, voltage between terminals thereof rises more as a magnitude of current is increased during regenerative operation, i.e. during charge operation. In FIG. 4, a direction of current being discharged is set to be positive.

In the present invention, when a motor vehicle is driven, performance is improved in a well-balanced manner between power running and regenerative operation in consideration of voltage fluctuations during power running and regenerative operation.

Figure 5:
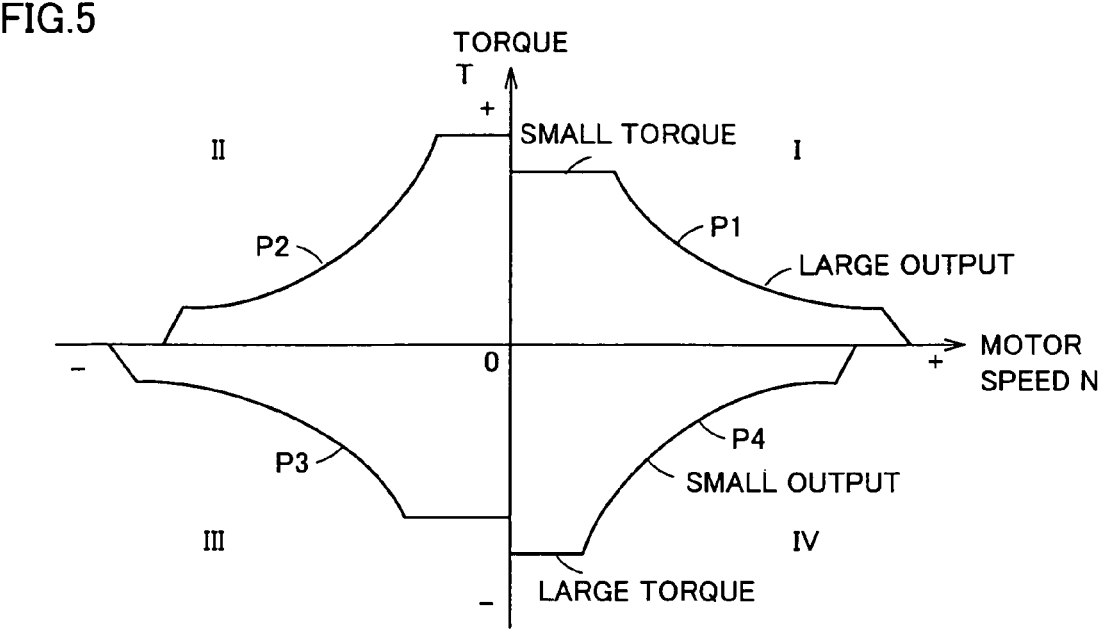
FIG. 5 is a diagram showing an operational characteristic exhibited when a maximum output of a rotating electric machine used for the present invention is controlled.

FIG. 5 is a diagram showing an operational characteristic exhibited when a maximum output of the rotating electric machine used for the present invention is controlled.

Referring to FIG. 5, the first quadrant shows a running state that generates positive motor speed and positive torque, the second quadrant shows a running state that generates negative motor speed and positive torque, the third quadrant shows a running state that generates negative motor speed and negative torque, and the fourth quadrant shows a running state that generates positive motor speed and negative torque. Note that the motor speed in the forward direction shown by the arrow in each of FIGS. 2 and 3 is set to be positive.

In other words, the first quadrant shows power running performed when the vehicle moves forward, the second quadrant shows power running performed when the vehicle moves backward, the third quadrant shows regenerative operation performed when the vehicle moves backward, and the fourth quadrant shows regenerative operation performed when the vehicle moves forward. The first quadrant and the third quadrant show curves point-symmetric with each other, and the second quadrant and the fourth quadrant also show curves point-symmetric with each other, because the directions of torque generated at the rotor are same while the rotation directions of the rotor are opposite.

In FIG. 5, a magnitude of an output shown by a maximum power curve in the first quadrant, i.e. during power running, is designed to be larger than that shown by a maximum power curve in the fourth quadrant, i.e. during regenerative operation. It is noted that the characteristic shown in FIG. 5 is exhibited when fixed power supply voltage is supplied. By adopting a rotor having the shape shown in each of FIGS. 2 and 3, an output in a curve P1 can be made larger than that in a curve P4. In this case, maximum torque generated when motor speed is low is smaller in curve P1 than in curve P4.

A maximum output during power running indicates a maximum work at which the rotary shaft is accelerated by positive torque, while a maximum output during regenerative operation indicates a maximum work at which the rotary shaft is decelerated by negative torque.

Figure 6:
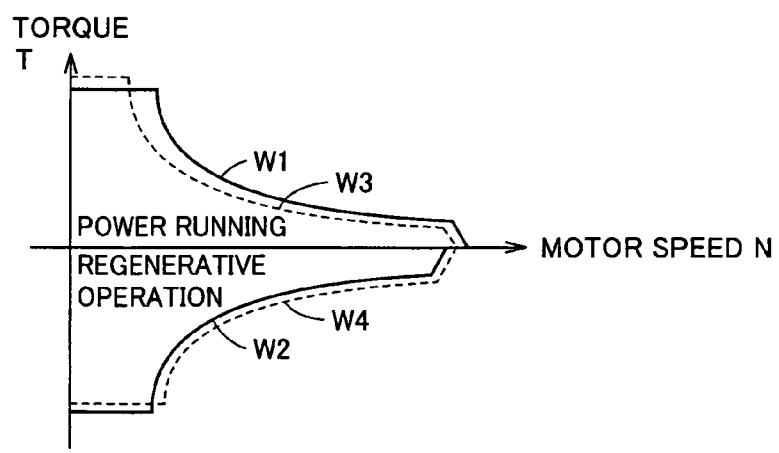
FIG. 6 is a diagram showing an operational characteristic exhibited when a maximum output of the rotating electric machine used for the present invention is controlled in consideration of voltage fluctuations of a battery.

FIG. 6 is a diagram showing an operational characteristic exhibited when a maximum output of the rotating electric machine used for the present invention is controlled in consideration of voltage fluctuations of a battery.

Referring to FIG. 6, dashed lines show the case of a reluctance motor having a conventional rotor having a bilaterally-symmetric shape. As described in FIG. 4, battery voltage is decreased during power running. Because of the decrease in battery voltage, a maximum power curve W3 during power running is shifted toward smaller magnitudes of the torque.

As described in FIG. 4, a magnitude of battery voltage is increased during regenerative operation. Accordingly, a maximum power curve W4 is shifted toward larger absolute values of the torque. In other words, an output in curve W3 during power running is significantly decreased when compared with an output in curve W4 during regenerative operation. If a conventional technique is used to design a motor such that a sufficient output can be obtained during power running, the motor exhibits a characteristic too enough for regenerative operation.

In contrast, solid lines W1 and W2 show the case of the present invention. When the curves shown in FIG. 5 are shifted under the influence of the voltage fluctuations of the battery, it is possible to implement the motor well-balanced between maximum power curve W1 during power running and maximum power curve W2 during regenerative operation, as shown in FIG. 6.

It is clearly understood that the embodiments disclosed herein are by way of illustration and not to be taken by way of limitation in all aspects. The scope of the present invention is indicated not by the description above but by the appended claims. It is intended to embrace all the modifications falling within the scope of the claims and meanings equivalent thereto.

The invention claimed is:

1. A vehicle drive system, comprising:
    a rotating electric machine structured to have a forward direction and a reverse direction as a rotation direction of an output shaft, a maximum output in said reverse direction being smaller than the maximum output in said forward direction;
    a battery discharging during power running of said rotating electric machine and being charged during regenerative operation of said rotating electric machine, voltage between terminals of said battery being increased while said battery is charged, and being decreased while said battery discharges; and
    a rotary shaft rotating in a direction allowing a vehicle to move forward in accordance with rotation of said output shaft in the forward direction.

2. The vehicle drive system according to claim 1, wherein said rotating electric machine includes
    a stator, and
    a rotor having a shape that allows the maximum output in the rotation in said reverse direction to be smaller than the maximum output in the rotation in said forward direction.

3. The vehicle drive system according to claim 2, wherein said rotor has a plurality of salient pole portions, and
    each of said plurality of salient pole portions has a shape tilted with respect to an axis passing through a rotation center and orthogonal to said output shaft.

4. The vehicle drive system according to claim 2, wherein said rotor is provided with a flux barrier bilaterally asymmetric with respect to an axis passing through a rotation center and orthogonal to said output shaft.

5. The vehicle drive system according to claim 1, further comprising:
    an inverter disposed on a path for receiving and distributing current between said battery and said rotating electric machine, and
    a control device obtaining rotation information from said rotating electric machine to control said inverter, wherein
    said control device controls said inverter such that torque in said forward direction is generated in a rotor in accordance with an acceleration instruction to allow said rotating electric machine to perform power running, and that torque in said reverse direction is generated in said rotor in accordance with a deceleration instruction to allow said rotating electric machine to perform regenerative operation.

6. A vehicle, comprising:
    a vehicle drive system, wherein said vehicle drive system includes
        a rotating electric machine structured to have a forward direction and a reverse direction as a rotation direction of an output shaft, a maximum output in said reverse direction being smaller than the maximum output in said forward direction,
        a battery discharging during power running of said rotating electric machine and being charged during regenerative operation of said rotating electric machine, voltage between terminals of said battery being increased while said battery is charged, and being decreased while said battery discharges, and
        a rotary shaft rotating in a direction allowing a vehicle to move forward in accordance with rotation of said output shaft in the forward direction; and
    a wheel connected to said rotary shaft.

7. The vehicle according to claim 6, wherein said rotating electric machine includes
    a stator and
    a rotor having a shape that allows the maximum output in the rotation in said reverse direction to be smaller than the maximum output in the rotation in said forward direction.

8. The vehicle according to claim 7, wherein
    said rotor has a plurality of salient pole portions, and
    each of said plurality of salient pole portions has a shape tilted with respect to an axis passing through a rotation center and orthogonal to said output shaft.

9. The vehicle according to claim 7, wherein said rotor is provided with a flux barrier bilaterally asymmetric with respect to an axis passing through a rotation center and orthogonal to said output shaft.

10. The vehicle according to claim 6, wherein
    said vehicle drive system further includes an inverter disposed on a path for receiving and distributing current between said battery and said rotating electric machine, and a control device obtaining rotation information from said rotating electric machine to control said inverter, and said control device controls said inverter such that torque in said forward direction is generated in a rotor in accordance with an acceleration instruction to allow said rotating electric machine to perform power running, and that torque in said reverse direction is generated in said rotor in accordance with a deceleration instruction to allow said rotating electric machine to perform regenerative operation.

\* \* \* \* \*